United States Patent [19]

Schmidt

[11] Patent Number: 4,682,674

[45] Date of Patent: Jul. 28, 1987

[54] APPARATUS FOR LIMITING BACK PRESSURE IN AN EXHAUST-TYPE ENGINE SUPPRESSOR

[76] Inventor: Alfred Schmidt, Burgstrasse 11, Pottenstein/Ofr, Fed. Rep. of Germany, 8573

[21] Appl. No.: 763,216

[22] Filed: Aug. 7, 1985

[30] Foreign Application Priority Data

Aug. 16, 1984 [DE] Fed. Rep. of Germany ....... 3430028

[51] Int. Cl.[4] .......................... F02D 9/06; F01N 7/00; F16K 3/00

[52] U.S. Cl. ...................................... 188/273; 60/324; 137/599; 251/212

[58] Field of Search ................ 188/273; 267/175, 177; 123/323; 60/324; 137/599; 251/212, 305, 308; 138/46

[56] References Cited

U.S. PATENT DOCUMENTS 1,799,426 4/1931 Lang et al. .......................... 251/212

2,947,392 8/1960 Meine .............................. 123/323 X 4,111,166 9/1978 Alstrin et al. ................... 188/273 X

FOREIGN PATENT DOCUMENTS 1555833 6/1973 Fed. Rep. of Germany ...... 188/273

849439 11/1939 France ............................... 188/273

2063998 6/1981 United Kingdom ................ 123/323

2081378 2/1982 United Kingdom ................ 123/323

*Primary Examiner*—Andres Kashnikow

*Assistant Examiner*—Robert J. Oberleitner

*Attorney, Agent, or Firm*—Holman & Stern

[57] ABSTRACT

A pressure relief device for a throttle-type engine exhaust suppressor comprises a valve bore opening into the exhaust pipe in the region of an end face of the throttle valve when the throttle valve is in closed position. The valve bore incorporates a spring loaded valve poppet. When a predetermined back pressure is established in the exhaust pipe, the valve poppet opens against the spring pressure and provides a bypass around the throttle valve.

3 Claims, 4 Drawing Figures

APPARATUS FOR LIMITING BACK PRESSURE IN AN EXHAUST-TYPE ENGINE SUPPRESSOR

BACKGROUND OF THE INVENTION

This invention relates to apparatus for limiting the dynamic air pressure or back pressure in an exhaust-type engine supressor or brake, wherein a butterfly-type throttle valve is pivotally mounted in an exhaust pipe, such that the throttel valve can be moved between open and closed positions, and wherein a relief opening is provided for bypassing the throttle valve when the valve is in closed position.

To avoid deleterious effects on an engine equipped with an exhaust-type engine suppressor, it is desirable to limit the maximum back pressure imposed thereby. A known form of pressure lmiting device comprises simply an equalizing opening in the form of a constantly open passage through the throttle valve. However, at low engine rpm, the constantly open passage prevents build-up of adequate engine back pressure and thus may cause a reduction of the pressure under conditions when such reduction is undesirable.

SUMMARY OF THE INVENTION

It is an object of the invention to provide an apparatus of the type described which, taking into account the given parameters of the engine suppressor and the properties desirable for such apparatus, becomes operative only when a prescribed back pressure is present.

According to the invention, an exhaust-type engine suppressor of the type described is provided with pressure relief means in the form of a valve bore communicating with the exhaust pipe adjacent an end face of the throttle valve when the latter is in closed position, the bore extending beyond the end face of the valve on both sides thereof, i.e., upstream and downstream of the exhaust pipe by a distance equal to at least one-fifth of the diameter of the bore, and a valve poppet slidable in the valve bore which is urged into closed position, i.e., substantially engaging the end face of the throttle valve by means of a spring external to the exhaust pipe.

The spring force is adjusted to correspond to the prescribed back pressure. When this pressure is reached, the spring allows the valve poppet to retract, whereby an open passage through the valve bore is provided such that gas can bypass the end face of the throttle valve through the passage. The pressure release means is inexpensive and does not substantially increase the noise level developed by the exhaust-type engine suppressor. The effect of temperature dependence of the spring force is minimized by spacing the spring from the heat-radiating exhaust pipe. Thus, the device operates with minimal noise and substantially independently of the temperature of the exhaust pipe.

It is advantageous for the valve bore and the valve poppet to extend beyond the end face of the throttle valve on both sides thereof by a distance equal to at least one-quarter the diameter of the valve bore. Such increased extension results in more than just an increase in the passage area. Because the pressure which acts initially to open the valve poppet against the spring force is operative only on one of the extended regions of the valve poppet, namely the upstream region, and because the spring force must not be set too low, to provide the desired rigidity, a substantial such extended region is desirable.

It is also advantageous for the spring force to increase with increased retraction of the valve poppet. Thus, when the pressure exceeds the prescribed limit, the poppet will open by an amount which varies depending on the amount by which the precipitating pressure exceeds said limit. The relation between the increase in pressure above the limit and the degree of opening of the poppet will increase substantially proportionally but when the pressure is only slightly above the limit, the valve poppet will open to only a slight degree because additional compression of the spring requires increased force.

The compression spring may be in the form of a gas compression spring, for example. However, for simplicity of design, a mechanical spring may be used conveniently a helical coil spring. Obviously, however, any suitable mechanical spring means may be employed.

It is also advantageous if the valve bore and the valve poppet are spaced from the lowermost region of the exhaust pipe, preferably being located in the uppermost region thereof. This eliminates or minimizes the threat of penetration of water of condensation into the poppet valve.

It is also advantageous for the valve poppet to have a valve stem located in a gas-tight valve casing behind the valve poppet, with the spring being located therein between the poppet and an outer pressure member. The space between the valve poppet when the poppet is in the closed position and the pressure member may communicate with the exhaust pipe downstream of the throttle valve via a relief duct. Because there is play between the valve poppet and the valve bore, pressurized gas penetrates behind the valve poppet. This gas can then be discharged when the valve poppet is in the closed position.

The face of the valve poppet may have a curvature conforming to that of the interior surface of the exhaust pipe and the poppet may be secured against rotation about its axis. It is advantageous, however, if the valve poppet is rotatable in the valve bore and the face of the poppet has a concave, cuplike shape, in the nature of a spherical segment with a radius conforming to that of the exhaust pipe. With this configuration, the poppet can rotate about its axis, and sliding guides for preventing such rotation may be dispensed with.

The throttle valve may be slidably or pivotably mounted. In the latter case, detents may be provided in the exhaust pipe for locating the valve in the closed position. The configuration of the throttle valve may be elliptical. In its closed position, the throttle valve still has air and adequate play along its perimeter with respect to the exhaust pipe.

The forward incursion of the valve poppet toward the interior of the exhaust pipe may be limited by a detent or shoulder to prevent the poppet from entering the interior of the exhaust pipe, and outward excursion of the poppet may be similarly limited by a detent, shoulder or the like, since after a certain point in said excursion the available passage area in the valve bore does not continue to increase.

DESCRIPTION OF PREFERRED EMBODIMENT

Figure 1:
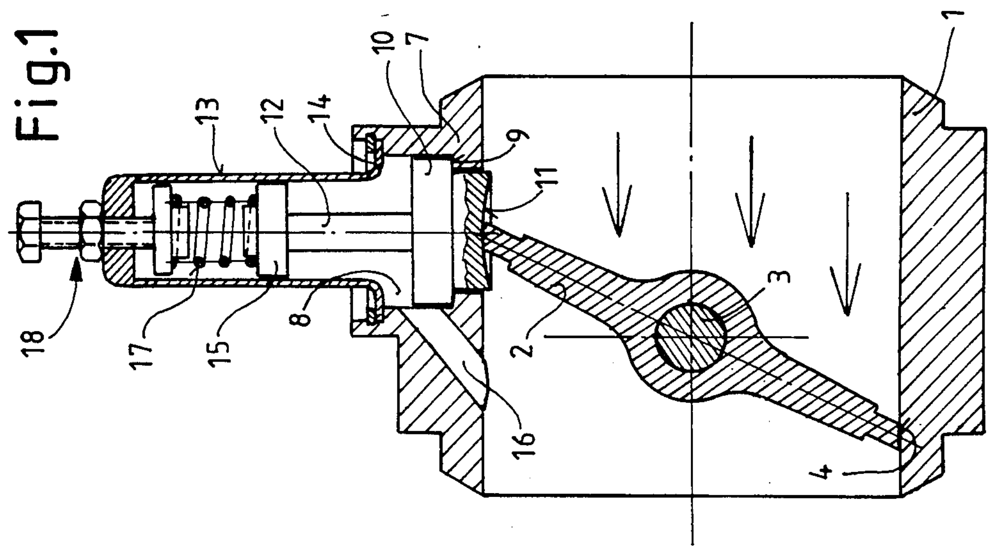
FIG. 1 is a cross sectional view of apparatus in accordance with the invention for limiting back pressure in an exhaust-type engine surpressor, the apparatus being shown in closed position.
Figure 2:
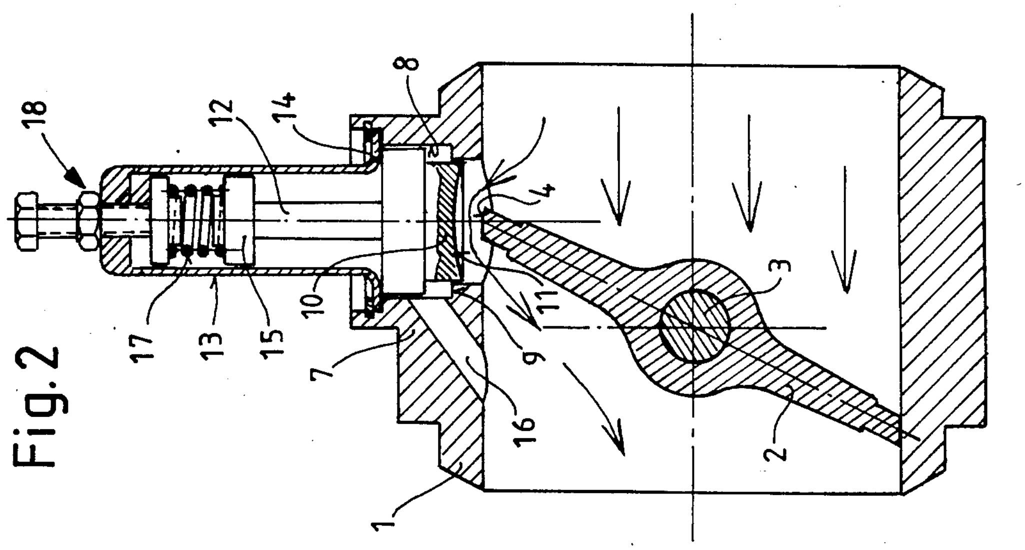
FIG. 2 is a view similar to FIG. 1 but with a valve poppet of the apparatus shown in open position.
Figure 4:
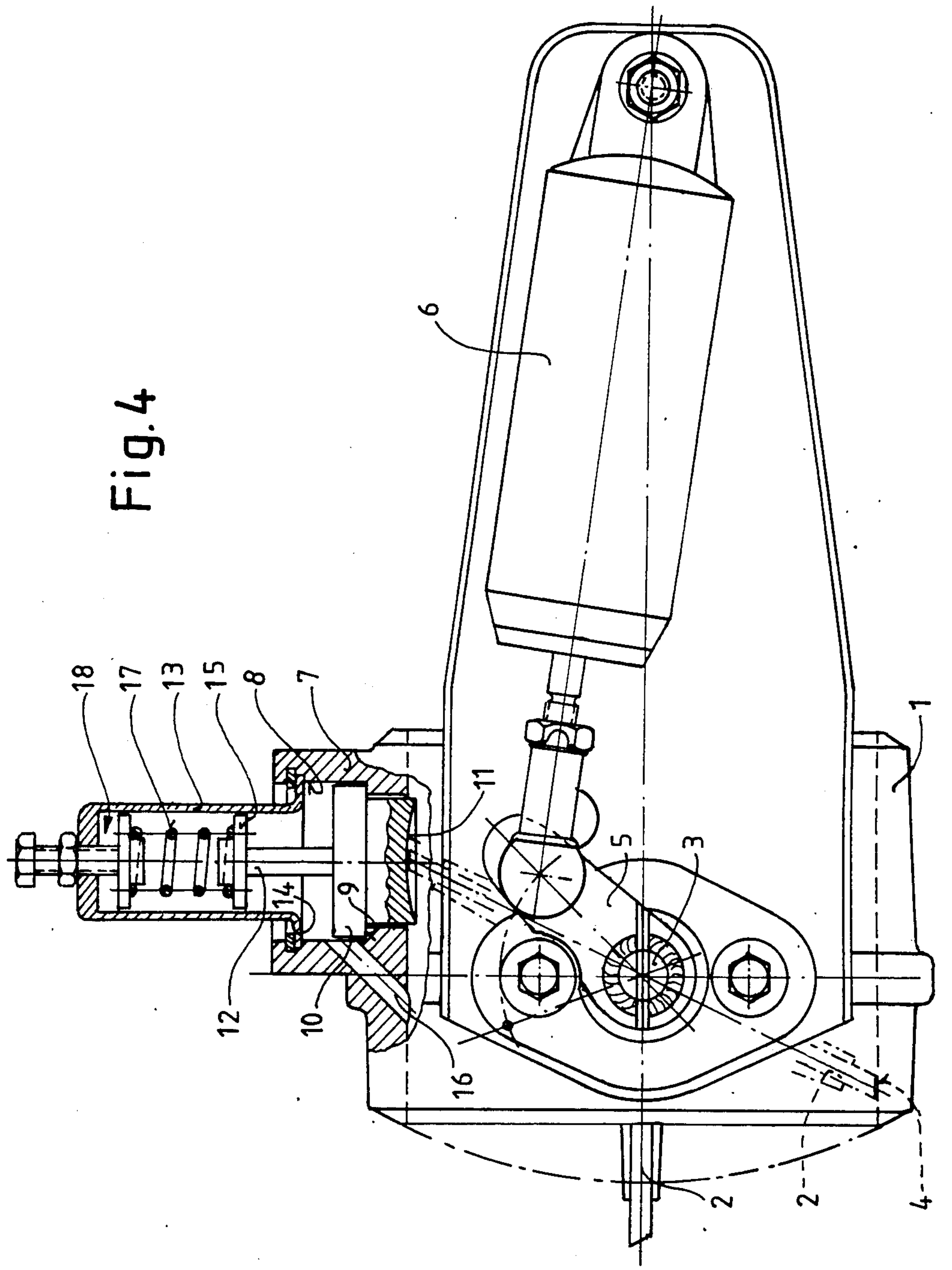
FIG. 4 is an external side elevational view thereof.

The drawings show a segment of an exhaust pipe 1 which is circular in cross section. A butterfly-type throttle valve 2 is disposed within the exhaust pipe on a pivot 3 on the center line of the pipe. The throttle valve has an elliptical shape and is disposed (as seen in FIGS. 1, 2 and 4) in a slightly inclined attitude when in closed position. In the closed position, a pivotal end face 4 of the throttle valve substantially engages an interior wall of the exhaust pipe 1. The throttle valve is swung from the closed position shown in dot-dashed lines in FIG. 4 to a horizontal open position and back via a crank drive 5 actuated by a piston-cylinder device 6.

On the upper side of the exhaust pipe 1 there is provided a valve housing 7 formed with a valve bore 8 which is circular in cross section and has a shoulder making it narrow adjacent the interior of the pipe 1 to form an interior detent surface 9. The valve bore 8 accomodates a valve poppet 10 which has a corresponding shoulder so that its segment portion nearest the interior of the pipe 1 is narrower than its portion remote therefrom. In the closed position of the valve, the shoulder of poppet 10 rests against the shoulder 9 of the valve housing. The end face of poppet 10 which faces the interior of the exhaust pipe has a concave suface 11 in the natrure of a spherical segment. Substantial areas of the poppet, i.e., the surface 11 extend axially of exhaust pipe 1 beyond the end face 4 of the throttle valve on both sides of the end face 4 when the throttle valve 2 is in the closed position as shown in FIG. 1.

Poppet 10 is provided with an elongate valve stem 12 which extends into a valve casing 13 mounted on the valve housing 7 and held in place, for example, by a circlip. A forward flanged portion of the casing serves as an outer abutment 14 for the poppet 10, to limit rearward excursion thereof in back and forth movement of the poppet. A pressure flange 15 is provided on the rear end of the stem 12 which flange is slidably guided in the cylindrical casing 13. On the downstream side of the throttle valve 2, a relief channel 16 having a relatively large cross sectional area connects exhaust pipe 1 with valve bore 8 in such a way that when the poppet 10 is in an advanced postion, the channel 16 is only partially closed off by the poppet 10, i.e., is partially open, and when the poppet is fully retracted, the channel 16 is also at least partially open, i.e., is only partially blocked by the poppet.

A coil spring 17 is connected between the rear side of the pressure flange 15 and an abutment member at the top of the valve casing which may have a screw adjustment mechanism 18 for adjusting the force of the spring.

In the advanced position of the poppet 10 (FIG. 1), the spring 17 is under compression and the compression force is increased when the poppet 10 is in the retracted position (FIG. 2).

Figure 3:
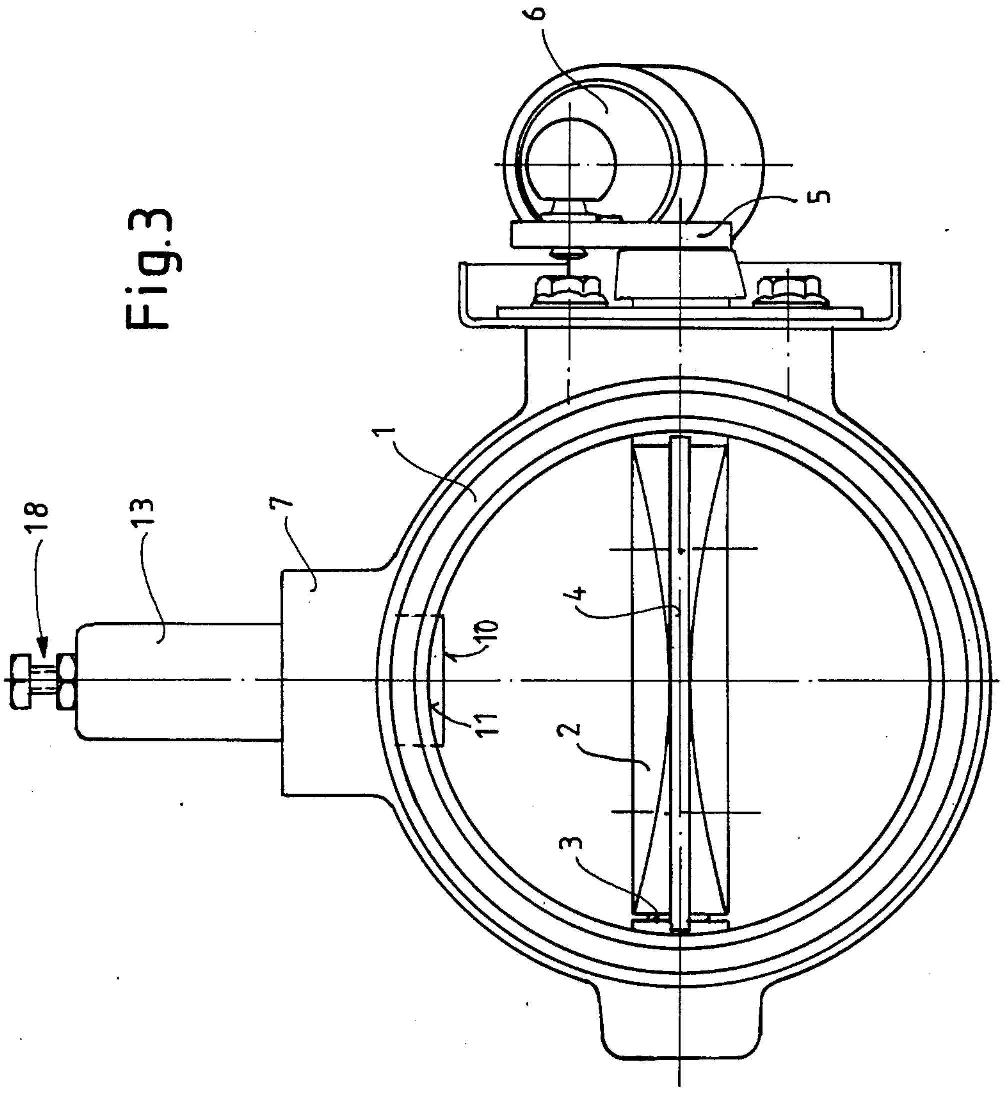
FIG. 3 is a end elevational view of the apparatus of FIG. 1.

As may be seen from FIGS. 3 and 4, the butterfly-type throttle valve 2 can be moved from the open position which is horizontal (i.e., parallel to the center axis of the exhaust pipe 1), into the closed position, which is generally transverse to the center axis by the external piston assembly 6.

While only a preferred embodiment of the invention has been described herein in detail, the invention is not limited thereby and modifications can be made within the scope of the attached claims.

I claim:

1. Apparatus for limiting back pressure in an exahust-type suppressor comprising a butterfly-type throttle valve pivotally mounted about a valve pivot in an engine exhaust pipe of circular cross-section, such that the throttle valve can be moved from an open position to a closed position, the throttle valve having a rim and assuming an oblique attitude when in the closed position, a valve bore communicating with the exhaust pipe at a location which is circumferentially spaced and longitudinally offset from the valve pivot so as to correspond with a location occupied by an end face portion of the throttle valve rim remote from the pivot when the valve is in closed position, a valve poppet slidable in the bore, and a spring disposed outwardly of the exhaust pipe with respect to the poppet for urging the poppet inwardly toward the throttle valve and permitting movement of the poppet outwardly in response to a back pressure of predetermined value being created in the exhaust pipe so as to provide a bypass around the throttle valve, the poppet valve having a concave end face which conforms in curvature to the curvature of the exhaust pipe.

2. Apparatus as claimed in claim 1 wherein the exhaust pipe has a bottom and a top, and wherein the valve bore and valve poppet are spaced from the bottom of the exhaust pipe.

3. Appartus as claimed in claim 1 wherein the valve bore communicates with the exhuast pipe at a location which is circumferentially spaced through 90 degrees from the valve pivot.

* * * * *